(12) United States Patent
Lymer et al.

(10) Patent No.: US 6,230,117 B1
(45) Date of Patent: May 8, 2001

(54) SYSTEM FOR AUTOMATED INTERFACE GENERATION FOR COMPUTER PROGRAMS OPERATING IN DIFFERENT ENVIRONMENTS

(75) Inventors: Sharon Frances Lymer; Michael Starkey; John Wright Stephenson, all of Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/046,366

(22) Filed: Mar. 23, 1998

(30) Foreign Application Priority Data

Mar. 27, 1997 (CA) .................................................. 2201254

(51) Int. Cl.[7] .............................. G06F 9/45; G06F 13/00; G06F 13/14
(52) U.S. Cl. ................................ 703/22; 707/4; 709/202; 709/313; 717/2; 717/5
(58) Field of Search ........................ 395/500.44, 500.43, 395/500.41, 684, 701, 712, 200.33; 703/22, 23, 395, 24; 709/300, 101, 104, 202, 227, 228, 313; 707/4, 101, 102, 104; 717/1–11

(56) References Cited

U.S. PATENT DOCUMENTS

| | | | |
|---|---|---|---|
| 5,295,222 | * 3/1994 | Wadhwa et al. | 395/703 |
| 5,301,270 | * 4/1994 | Steinberg et al. | 395/326 |
| 5,329,619 | * 7/1994 | Page et al. | 709/203 |
| 5,428,782 | * 6/1995 | White | 709/101 |
| 5,634,127 | * 5/1997 | Cloud et al. | 709/300 |
| 5,761,494 | * 6/1998 | Smedley et al. | 707/4 |
| 5,812,768 | * 9/1998 | Page et al. | 709/228 |
| 5,923,879 | * 7/1999 | Sasmazel et al. | 395/705 |
| 5,987,247 | * 11/1999 | Lau | 395/702 |
| 6,006,277 | * 12/1999 | Talati et al. | 709/300 |
| 6,014,517 | * 1/2000 | Shagam et al. | 395/705 |
| 6,094,688 | * 7/2000 | Mellen-Garnett et al. | 709/328 |

OTHER PUBLICATIONS

Textbook, David a. Taylor, Object–Oriented Information Systems, 1992, john Wiley & Sons, Chapter 11, pp. 296–299.*

Textbook, Thomas Mowbray and William Ruh, Inside CORBA, 1997, Addison Wesley Longman, Inc., Preface pp. xxi–xxiii, Figures 8.7 and 8.8 and pp. 224–225.*

* cited by examiner

*Primary Examiner*—Kevin J. Teska
*Assistant Examiner*—Lonnie A. Knox
(74) *Attorney, Agent, or Firm*—Scully, Scott, Murphy & Presser; Casey P. August

(57) ABSTRACT

The present invention is directed to a system for for automated interface generation for computer programs operating in different environments. The system comprises a utility which imports a CICS COBOL transaction source file, parses the communication area of the CICS file, and generates modelling information. The modelling information represents the nature and structure of data in the CICS transaction source file, and is written to a persistent data store. The utility uses the information in the persistent data store to generate an application programming interface. The application programming interface takes the data values from the other language and translates them to a formatted CICS COBOL communications area. This format is derived from the definition of the CICS communications area contained in the imported CICS program. After the translation runs, the resulting CICS COBOL communications area is translated back to the data values of the other language. This translation step also handles the data conversion between different codepages and machine architectures and program semantics. The resulting language values represent the result of the transaction. The CICS transaction is accessed using the CICS External Call Interface mechanism.

12 Claims, 1 Drawing Sheet

Microfiche Appendix Included (1 Microfiche, 20 Pages)

SYSTEM FOR AUTOMATED INTERFACE GENERATION FOR COMPUTER PROGRAMS OPERATING IN DIFFERENT ENVIRONMENTS

SOURCE CODE APPENDIX

A one card microfiche appendix containing 20 frames of source code of a computer program used with the present invention is appended hereto as Appendix A.

BACKGROUND OF THE INVENTION

1. Technical Field

The present invention relates to computer systems, and more particularly to an automated system for generating an interface between computer programs in different programming languages and operating in different environments.

2. Prior Art

The trend in computing is towards systems which support multiple program environments. The support of multiple program environments provides a flexible computing platform. For example, computer programming languages supported by personal IBM compatible computers include JAVA, $C^{++}$, C, PASCAL, FORTRAN, COBOL, and BASIC running on DOS or OS/2 operating systems. Another trend in computer systems is the implementation of distributed computing systems. Distributed computing comprises a client-server model in which a client program and a server program run, and typically the client and the server execute on different systems in the computer network.

As computer systems become more open and flexible, the variety of program environments makes the sharing of information difficult. Associated with the addition of each program environment is a new way of handling data. In the context of COBOL, accessing existing or legacy COBOL on a mainframe or networked computer is typically performed through CICS (Customer Information Control System) transactions. In order to remotely access the COBOL program from another computer environment such as $C^{++}$ or JAVA requires the programmer to perform three tedious and time consuming tasks. First, the programmer must establish a mapping between the other language types and the COBOL data types. Second, the programmer must translate the data and semantics of the other language to the corresponding COBOL data type. This problem is compounded by the fact that the interaction of CICS programs is foreign to most JAVA users who are most familiar with components. In addition, the COBOL data must be formatted according to the alignment rules of COBOL so that the CICS transaction recognizes the data being passed. Third, the data passed between the two machines (i.e. computing environments) must be translated to the format of the target machine. In practical terms this means that a codepage translation must be done and native data such as floating point and integer data must be translated to the format of the target machine. The translation of the data must be performed in both directions, i.e. the call of the CICS transaction from the target machine, and the return to the CICS transaction from the target machine.

SUMMARY OF THE INVENTION

The present invention provides a system for generating an interface which defines the mapping from an existing COBOL program to computer programs written in other languages, and is particularly suited to the $C^{++}$ and JAVA platforms. The system according to the present invention creates an interface which defines the mapping of data types and different program semantics between COBOL and the other language, translates the data types between COBOL and the other language, and handles the conversion between codepages and machine architectures.

The system according to the present invention also incorporates the unit of work semantic into the created interface. The unit of work semantic is part of the CICS External Call Interface. The interface that is created and the code that is generated to implement the interface conform to the component model which allows for seamless integration with other tools.

In a first aspect, the present invention provides an import utility for interfacing a COBOL program through a CICS transaction to a program in another program environment, said import utility comprising: (a) scanner means for scanning the CICS transaction for said COBOL program and producing a data description of said CICS transaction; (b) parser means for parsing said data description into a corresponding token stream; (c) importer means for importing said token stream and generating a data model describing said CICS transaction in said other program environment, said data model including means for converting information between said CICS transaction and a program in said other program environment, and said data model being compatible for generating code for an invoking mechanism in a program for invoking said CICS transaction from said other program environment.

In a second aspect, the present invention provides a computer system having a first program environment and a second program environment, said computer system comprising: an importer having scanner means for scanning a transaction interface for a program running in said first program environment and producing an output describing the transaction interface for the program in said first program environment, parser means for parsing the output description from said scanner means and generating a token stream, creator means for creating a data model from said token stream, wherein said data model includes means for converting information from said transaction interface for a program running in said second program environment; a compiler having means for compiling a program in said second program environment and said data model to produce an executable program, said executable program including invoking means derived from said data model for accessing the program operating in said first program environment.

In another aspect, the present invention provides a computer program product for use in computer system having a first program environment and a second program environment, said first program environment providing an operating platform for a COBOL program and CICS transactions, said computer program product comprising: a recording medium; means recorded on said medium for instructing said computer system to perform the steps of, (a) scanning the CICS transaction in said COBOL program and producing a data description of said CICS transaction; (b) parsing said data description into a corresponding token stream; (c) creating a data model from said token stream wherein said data model describes said CICS transaction in said second program environment and includes means for converting information between said first and second program environments, and said data model being compatible for generating code for an invoking mechanism in a program for invoking said CICS transaction from said second program environment.

BRIEF DESCRIPTION OF THE DRAWING

Preferred embodiments of the present invention will now be described, by way of example only, with reference to the accompanying drawing, in which.

DETAILED DESCRIPTION OF THE PREFERRED EMBODIMENTS OF THE INVENTION

Figure 1:
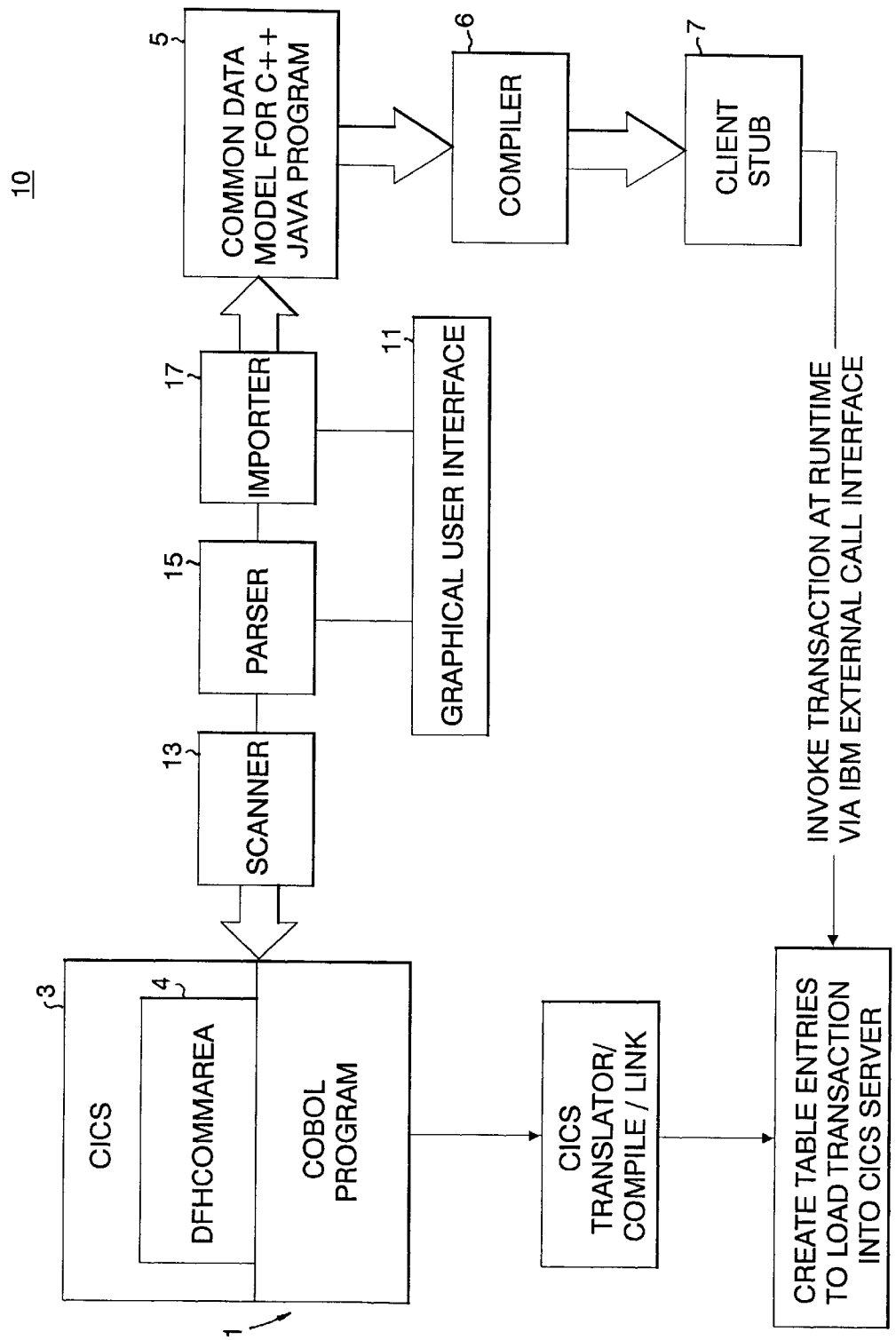
FIG. 1 shows in diagrammatic form the components of a system for automated interface generation according to the present invention.

The present invention provides a system for automated interface generation for computer programs operating in different environments. The interface generated by the system allows an application program to seamlessly access a transaction in another program from a remote location. In the following description, the system is described in the context of a C++ application accessing a COBOL program through the CICS transaction environment. (The CICS or Customer Information Control System is a known mechanism which controls the input/output access to a COBOL program.) It will however be understood that the system has wider applicability to other languages including JAVA, and the attached microfiche APPENDIX shows a generated client stub code in JAVA.

Reference is made to FIG. 1 which shows a COBOL importer 10 according to the present invention. The importer 10 interfaces to a COBOL program 1 by reading a CICS transaction interface 3 from the file system and creating mapping information (i.e. a model) for the Common Data Model (CDM) model 5. As will be understood by those skilled in the art, the CDM is a data structure for storing "meta-data" which is used by the builder for the C++ or JAVA programming environments. The meta-data is used to generate C++ and JAVA constructs which will provide the capability to seamlessly invoke the CICS transaction from an application program in C++ (or JAVA) using an IBM CICS External Call Interface (ECI) to the CICS transaction 3.

As shown in FIG. 1, the COBOL importer 10 comprises a graphical user interface or GUI 11, a scanner 13, a parser 15 and an importer 17. The operation of these components results in the mapping of the CICS transaction 3 to a method in a user-specified class in the C++ environment or JAVA.

The GUI 11 provides the facility to query the programmer (i.e. user) for the information needed for the COBOL importer 10 to generate the constructs for the CDM model 5. Through dialog generated by the GUI 11, the user is queried for the name of the class in C++ which will contain the method (i.e. client stub 7) representing the CICS transaction, the method name to create in the class, the file name of the transaction, the name of the 01 Level record in the COBOL file, and the name of the transaction to run as identified to the ECI. Optionally, the user supplies an ID for the CICS transaction.

The scanner 13 interfaces to the CICS transaction 3 for the COBOL program 1 (specified by the user). The scanner 13 scans the file containing the CICS transaction 3 to produce a token stream for the parser 15. The scanner 13 produces the token stream expected by the parser 15. The scanner 13 is implemented to differentiate the various kinds of COBOL picture strings and produce different tokens for use by the parser 15.

The primary function of the parser 15 is to parse the records in the COBOL program 1 for the specified 01 Level records, for example DFHCOMMAREA 4 for the CICS transaction 3 to construct the representation of the "commarea" as C++ data types in a C++ class structure. The input and output data for the CICS transaction 3 are specified in the DFHCOMMAREA 4 of the COBOL program 1. The "commdata area" comprises a group of records which describe the format and size of the data expected by the CICS transaction 3. The commdata area is also used to return results back to the calling C++ program.

In a typical implementation, the parser 15 will not be as semantically rich as an actual parser for COBOL programs, and the semantic actions are kept simple by creation of the class 'Record'. As result, the COBOL importer 10 expects that the CICS transaction compiles cleanly with a COBOL compiler.

The importer module 17 provides a number of functions. First, the importer 17 contains the classes which drive the parsing of the COBOL program through the parser 15. Secondly, the importer module 17 stores the information generated by the operation of the parser 15, and thirdly, in response to the parser 15, the importer 17 adds the appropriate constructs and information into the CDM data model 5.

As described above the GUI 11 queries the user through a GUI dialog for the name of the C++ class or JAVA to contain the method representing the CICS transaction 3 for the COBOL program 1, the name of the method and the name of the CICS transaction 3. The C++ class named by the user in the GUI 11 is created on the first import of the transaction 3 to the class. The class contains the methods that will drive the transaction via the CICS/ECI (External Call Interface) and is marked in the CDM model 5 as having been created by the COBOL importer 10. If the class name is found to already exist in the CDM model 5 but was created using a method other than the COBOL importer 10, the GUI 11 prompts the user for another name. Similarly, the user provided method name is checked if it already exists in the named class. The COBOL importer 10 allows the user to add several transactions to the CICS/ECI class. The same CICS transaction 3 may be imported more than once as long as the user chooses a different method name for each import operation.

The COBOL importer 10 creates the following C++ constructs for the CDM data model 5. The constructs are used to generate the code 6 for a client stub 7 in the C++ program when the application is compiled. At runtime, the client stub 7 invokes the CICS transaction 3 through the IBM CICS External Call Interface (ECI).

The COBOL importer 10 creates a user-specified class: <user class>. The <user class> is created on the first import of a CICS transaction 3 to that class.

The importer creates a public method in <user class> using the user-specified name: <method>. The signature for the method is <method>(<parm class>* pParmBlock), (<parm class> is described below).

For each <method>, the importer creates a class: <parm class> which contains declarations for the parameters to the CICS transaction 3. The class <parm class> also provides inspector ('get') and manipulator ('set') methods for each elementary item in the data area DFHCOMMAREA 4.

For each group item in the DFHCOMMAREA 4, the importer 10 creates: a 'nested' class: <containing class>__<group>, where <group> is the name of the group item in the COBOL program 1; a private data member: <group>__ of this class in the <containing class>; and a default constructor for the nested class having the form: <containing class>__<group>( ). It will be understood that in a CDM implementation, the COBOL importer 10 will utilize actual CDM scoped classes, and the CDM will handle the scoping of the class names.

For each elementary item in a group, the COBOL importer 10 also creates a private data member: <item>__ in the containing class, where <item> is the name of the elementary item in the COBOL program 1. If this item is not an array or a member of a group which is itself an array, the COBOL importer 10 also creates a manipulator ('set') method and an inspector ('get') method in the <parm class>. The get and set methods allow the user to access and manipulate data in the DFHCOMMAREA 4. The 'set' and 'get' methods preferably take the following form: void set<item>(const <basetype>& a<item>) and <basetype> <item>( ) const.

In the implementation of the COBOL importer 10 it is preferable that all items appear as public data members in the generated C++ code, and not as private members. This allows a user to access records which are arrays using direct manipulation.

The importer 17 component in FIG. 1 comprises the following major classes: COBOLImporter, Record, ElementaryItem (derived from Record), Group (derived from Record), GroupItem (derived from Group), and CobolCommArea (derived from Group).

The COBOLImporter class also includes a method to create <parm class>. The method belongs to the COBOLImporter class as a private member.

The importer 17 includes the class 'Record' which is an abstract base class. The class Record encapsulates the behaviour and data associated with a single COBOL record from the CICS transaction 3. The Record class is designed to store information obtained by the parser 15 which is necessary to create the constructs for the CDM model 5 required to support CICS/ECI calls to the original CICS transaction 3. An instance of one of the classes derived from 'Record' is created by the parser 15 as each new record declaration is encountered in the COBOL program 1. The constructor for a 'Record' takes the owning COBOL group, the COBOL record name and the level as arguments. To ensure only derived classes are created, the constructor for 'Record' is specified as 'protected'. The abstract base class 'Record' is described in more detail below.

Descriptions for the classes derived from 'Record', 'ElementaryItem', 'Group', GroupItem' and 'CobolCommArea' are also described below.

The class 'Record' includes a number of public methods. The public methods comprise inspectors and manipulators for the following protected data members: name__, level__, owner__, filler__, alignment__, picString$_{13}$, cPlusPlusType__, usage__, sign__, and arrayBound__. The name__ data member contains the name of the COBOL record. The level__ data member contains the level of the COBOL record. The owner__ data member points to the group to which the COBOL record belongs. The filler__ data member indicates if the current record is designated as 'filler' in the COBOL program 1. The alignment__ data member indicates if the current record is designated as 'sync' in the COBOL program 1. The picString__ data member contains the picture string definition for the COBOL record.

The cPlusPlusType data member contains a pointer to the C++ type for the COBOL record. The following type conversions were chosen for COBOL importer 10 based on published IBM Technical Disclosure Bulletin (Vol. 37 No.01 January 1994), titled: Cobol Data-Type Support in the Interface Definition Language. The type conversions are:

numeric type: 9(1–4) converted to unsigned short int
numeric type: 9(5–9) converted to unsigned long int
numeric type: S9(1–4) converted to short int
numeric type: S9(5–9) converted to long int
numeric type: {S}9(n)V9(m) converted to double
numeric type: {S}{V}P(n)9(m) converted to double
numeric type: {S}9(n)P(m){V} converted to double
usage comp-1 converted to float
usage comp-2 converted to double
alpha types converted to IString
alphanumeric types converted to IString
alphanumeric-edited types converted to IString
numeric-edited types converted to IString (Including numeric types using the 'blank when zero' clause).

Items enclosed in brace brackets '{}' indicate optional items. The type of the cPlusPlusType member is 'CPlusPlusType*'. There is an instance of this class declared for each 'base type' required by the COBOL importer 10. The base types comprise: IString, unsigned long int, unsigned short int, long int, short int, float, and double.

The usage__ data member indicates the usage for the COBOL record. The usage__ member may have the following values: nousage, display, displayNumeric, displayNonNumeric, comp, comp1, comp2, and comp3. The usage__ member is initialized to 'noUsage' when the record is constructed. The sign__ data member indicates the sign for the COBOL record. The sign__ can have the following values: nosign, leading, trailing, leadingseparate, and trailingseparate.

The arrayBound__ data member contains the arrayBound of the COBOL record. If the record in the COBOL program uses the 'occurs' clause, then arrayBound__ is set to the number of occurrences of the record. Otherwise, arrayBound__ is zero.

The alignment method for an elementary item returns the alignment for the group to which it belongs if no alignment is set for the item itself. Otherwise, the alignment method returns the alignment of this object.

The usage method for an elementary item returns the usage for the group to which it belongs if no usage is set for the item itself. Otherwise, the usage method returns the alignment of this object.

The sign method for an elementary item returns the sign for the group to which it belongs if no sign is set for the item itself. Otherwise, the sign method returns the alignment of this object.

The addAsAttribute method is also implemented for the ElementaryItem class. The addAsAttribute method contains all the actions necessary to add the item to the containing class as a private data member. If the item is not an array, the addAsAttribute method also adds an inspector and manipulator method to <parm class> to allow the user to access and manipulate the data member's value. The picture string, COBOL type (or PICAUGMENTOR), filler designation, and alignment properties are assigned for the data member in the CDM model 5.

The class CobolCommArea is a concrete class derived from the class 'Group'. A single object of the CobolCommArea class is instantiated by the importer in the class COBOLImporter to represent the group record for the DFHCOMMAREA 4 from the CICS transaction 3. This object acts as the 'root' of the tree of records constructed by the parser 15. The constructor takes the name of the COBOL program file, the transaction name and transaction ID as arguments. The constructor for the base class 'Group' is invoked with the 'owner' set to 0 (NULL), the name 'DFHCOMMAREA' and 'level' equal to 1.

In order to generate the appropriate code (i.e. client stub) to utilize the CICS/ECI middleware, certain property/value pairs are expected in the model for various CDM model constructs. The model constructs include DMMOOClass, DMMethod, and DMDataMember.

The method for the model is DMMethod and the method is created in <user class>. The property value IDAECI TRANSACTION is set to the name of the CICS transaction for the method DMMethod. This property is also used on the methods 'UOWCommitMethod' and 'UOWBackoutMethod' (see below) which are automatically created in <user class>. The property is set to the method name in these cases. The property IDAECI TRANSID is set to the user provided transaction ID.

Properties are also used to indicate the inspector and manipulator methods created for the user in <parm class>. These properties are IDAECI_GET and IDAECI SET and are set in the model for the inspector and manipulator methods, respectively. The value of these properties is the fully qualified class name of the attribute to be inspected/manipulated. Each method also has the property ATTRIB_NAME set to the name of the attribute.

The data member for the model is DMDataMember. Each data member created for an elementary item from the DFHCOMMAREA 4 has the following three properties: (1) IDAECI_PICSTRING; (2) IDAECI_PICAUGMENTOR; and (3) IDAECI_ALIGNMENT.

The original COBOL picture string clause is assigned to the IDAECI_PICSTRING property. The value of IDAECI_PICAUGMENTOR is a string which comprises the 'COBOL type' as listed below possibly followed by "+FILLER" designation. The "FILLER" is a keyword in COBOL which allows the COBOL programmer to define the size of unnamed portions on a structure to ensure the correct packing of named records. The COBOL importer 10 names these record items as "fill<n>", where <n> is the occurrence of the filler in the DFHCOMMAREA 4 minus one. The COBOL types are "SIGN_LEADING", "SIGN TRAILING", "SIGN_LEADING_SEPARATE", "SIGN_TRAILING SEPARATE", "DISPLAY", "DISPLAY_NUMERIC", "DISPLAY NONNUMERIC", "COMP", "COMP1", "COMP2", and "COMP3".

In addition to the user-specified methods created in a CICS/ECI class by the COBOL importer 10, four methods are made available in the class to handle logical units of work. These methods are (a) _IDAStartUOWO Start a logical unit of work; (b) _IDAEndUOWO End a logical unit of work when the next user-specified method (i.e. transaction) is called; (c) _IDACommitUOWO Commit the current logical unit of work; and (d) _IDABackoutUOWO Backout the current logical unit of work. There can be a maximum of one logical unit of work outstanding in a class at any given time. It is noted that the unit of work semantic is achieved through inheritance.

It will be understood that while the COBOL importer 10 according to the present invention was described in the context of $C^{++}$, the importer 10 is readily adaptable to programs in the JAVA language by using JAVA code and data types. The attached APPENDIX shows the details of the generated code for a client stub in JAVA.

While the invention has been particularly shown and described with respect to preferred embodiments thereof, it will be understood by those skilled in the art that the foregoing and other changes in form and details may be made therein without departing from the spirit and scope of the invention.

-20-

```
 1  APPENDIX
    EXAMPLE JAVA CLIENT STUB

5

10

15

20

25

30  CA9-97-007

35
```

-21-

```
public class Bank extends IDACicsUOWInterface {
  public Bank(Component c) throws Exception { super(c, "Bank"); }
  public void Action ( Bank_ActionCicsEciCommArea commarea ) throws Exception
    {
       invokeTxn( commarea );
    }
} public class Bank_Action_DFHCOMMAREA_AccountInfo
{
public Bank_Action_DFHCOMMAREA_AccountInfo () {
} public String Category_ = new String();
public String oldCategory_ = new String();

public int Account_;
public int oldAccount_;

protected void setCommArea( IDACallHandleCics ch ) throws IDAException
{
   int i;

ch.PIC("xx");
      ch.AUG("DISPLAY");
      ch.flatten ( Category_ );

ch.PIC("9(5)");
      ch.AUG("DISPLAY");
      ch.flatten ( Account_ );
} protected void getCommResult( IDACallHandleCics ch ) throws IDAException
{
   int i;

ch.PIC( "xx" );
      ch.AUG( "DISPLAY" );
      Category_ = ch.resurrect_String();

ch.PIC( "9(5)" );
      ch.AUG( "DISPLAY" );
      Account_ = ch.resurrect_int();
  }
} public class Bank_Action_DFHCOMMAREA_CustomerInfo_Addr
{ public Bank_Action_DFHCOMMAREA_CustomerInfo_Addr () {
} public String Street_ = new String();
public String oldStreet_ = new String();

public String City_ = new String();
```

-22-

```
    public String oldCity_ = new String();

public String Province_ = new String();
    public String oldProvince_ = new String();

public String Postal_Code_ = new String();
    public String oldPostal_Code_ = new String();

protected void setCommArea( IDACallHandleCics ch ) throws IDAException
    {
       int i;

ch.PIC("x(30)");
          ch.AUG("DISPLAY");
          ch.flatten ( Street_ );

ch.PIC("a(10)");
          ch.AUG("DISPLAY");
          ch.flatten ( City_ );

ch.PIC("a(2)");
          ch.AUG("DISPLAY");
          ch.flatten ( Province_ );

ch.PIC("A9AB9A9");
          ch.AUG("DISPLAY");
          ch.flatten ( Postal_Code_ );

} protected void getCommResult( IDACallHandleCics ch ) throws IDAException
    {
       int i;

ch.PIC( "x(30)" );
          ch.AUG( "DISPLAY" );
          Street_ = ch.resurrect_String();

ch.PIC( "a(10)" );
          ch.AUG( "DISPLAY" );
          City_ = ch.resurrect_String();

ch.PIC( "a(2)" );
          ch.AUG( "DISPLAY" );
          Province_ = ch.resurrect_String();

ch.PIC( "A9AB9A9" );
          ch.AUG( "DISPLAY" );
          Postal_Code_ = ch.resurrect_String();
    }
} public class Bank_Action_DFHCOMMAREA_CustomerInfo
{ public Bank_Action_DFHCOMMAREA_CustomerInfo () {
    }
```

-23-

```
    public String Customer_ = new String();
    public String oldCustomer_ = new String();

public Bank_Action_DFHCOMMAREA_CustomerInfo_Addr Addr_ =
                    new Bank_Action_DFHCOMMAREA_CustomerInfo_Addr();
    public Bank_Action_DFHCOMMAREA_CustomerInfo_Addr oldAddr_ =
                    new Bank_Action_DFHCOMMAREA_CustomerInfo_Addr();

protected void setCommArea( IDACallHandleCics ch ) throws IDAException
    {
       int i;

ch.PIC("a(28)");
         ch.AUG("DISPLAY");
         ch.flatten ( Customer_ );

Addr_.setCommArea(ch);
    } protected void getCommResult( IDACallHandleCics ch ) throws IDAException
    {
       int i;

ch.PIC( "a(28)" );
         ch.AUG( "DISPLAY" );
         Customer_ = ch.resurrect_String();

Addr_.getCommResult(ch);
    }

} public class Bank_ActionCicsEciCommAreaBeanInfo extends SimpleBeanInfo
{ public static java.lang.String getBeanClassName() {
   return("abc.Bank_ActionCicsEciCommArea");
} public java.beans.PropertyDescriptor getCategory_PropertyDescriptor()
                                    throws java.beans.IntrospectionException { java.beans.PropertyDescriptor aDescriptor = null;
   try {
      aDescriptor = new java.beans.PropertyDescriptor( "Category_", Class.forName(getBeanClassName()) );
   } catch (java.lang.ClassNotFoundException exc) {
   }
   aDescriptor.setBound(true);

return aDescriptor;
}

/**
 * Return the getCategory_ method descriptor.
 */
public java.beans.MethodDescriptor getGetCategory_MethodDescriptor() {
```

```
    java.beans.MethodDescriptor aDescriptor = null;
    try {
       java.lang.reflect.Method aMethod =
            Class.forName(getBeanClassName()).getMethod( "getCategory_", null );
       aDescriptor = new java.beans.MethodDescriptor(aMethod);
    } catch (Exception exc) { return null; };

aDescriptor.setName("getCategory_");
    return aDescriptor;

}

/**
 * Return the setCategory_ method descriptor.
 */
public java.beans.MethodDescriptor getSetCategory_MethodDescriptor() { java.beans.MethodDescriptor aDescriptor = null;
    try {
       java.lang.Class tclass[] = new java.lang.Class[1];
       tclass[0] = Class.forName("String");
       java.lang.reflect.Method aMethod =
            Class.forName(getBeanClassName()).getMethod( "setCategory_", tclass );
       aDescriptor = new java.beans.MethodDescriptor(aMethod);
    } catch (Exception exc) { return null; };

aDescriptor.setName("setCategory_");
    return aDescriptor;

} public java.beans.PropertyDescriptor getAccount_PropertyDescriptor()
                                    throws java.beans.IntrospectionException { java.beans.PropertyDescriptor aDescriptor = null;
    try {
       aDescriptor = new java.beans.PropertyDescriptor( "Account_", Class.forName(getBeanClassName()) );
    } catch (java.lang.ClassNotFoundException exc) {
    }
    aDescriptor.setBound(true);

return aDescriptor;
}

/**
 * Return the getAccount_ method descriptor.
 */
public java.beans.MethodDescriptor getGetAccount_MethodDescriptor() { java.beans.MethodDescriptor aDescriptor = null;
    try {
       java.lang.reflect.Method aMethod =
            Class.forName(getBeanClassName()).getMethod( "getAccount_", null );
       aDescriptor = new java.beans.MethodDescriptor(aMethod);
    } catch (Exception exc) { return null; };

aDescriptor.setName("getAccount_");
    return aDescriptor;
```

-25-

```
    }

/**
     * Return the setAccount_ method descriptor.
     */
    public java.beans.MethodDescriptor getSetAccount_MethodDescriptor() { java.beans.MethodDescriptor aDescriptor = null;
        try {
            java.lang.Class tclass[] = new java.lang.Class[1];
            tclass[0] = Integer.TYPE;
            java.lang.reflect.Method aMethod =
                    Class.forName(getBeanClassName()).getMethod( "setAccount_", tclass );
            aDescriptor = new java.beans.MethodDescriptor(aMethod);
        } catch (Exception exc) { return null; };

aDescriptor.setName("setAccount_");
        return aDescriptor;

} public java.beans.PropertyDescriptor getAction_PropertyDescriptor()
                                        throws java.beans.IntrospectionException { java.beans.PropertyDescriptor aDescriptor = null;
        try {
            aDescriptor = new java.beans.PropertyDescriptor( "Action_", Class.forName(getBeanClassName()) );
        } catch (java.lang.ClassNotFoundException exc) {
        }
        aDescriptor.setBound(true);

return aDescriptor;
    }

/**
     * Return the getAction_ method descriptor.
     */
    public java.beans.MethodDescriptor getGetAction_MethodDescriptor() { java.beans.MethodDescriptor aDescriptor = null;
        try {
            java.lang.reflect.Method aMethod =
                    Class.forName(getBeanClassName()).getMethod( "getAction_", null );
            aDescriptor = new java.beans.MethodDescriptor(aMethod);
        } catch (Exception exc) { return null; };

aDescriptor.setName("getAction_");
        return aDescriptor;

}

/**
     * Return the setAction_ method descriptor.
     */
    public java.beans.MethodDescriptor getSetAction_MethodDescriptor() {
```

```
            java.beans.MethodDescriptor aDescriptor = null;
            try {
                java.lang.Class tclass[] = new java.lang.Class[1];
                tclass[0] = Class.forName("String");
                java.lang.reflect.Method aMethod =
                        Class.forName(getBeanClassName()).getMethod( "setAction_", tclass );
                aDescriptor = new java.beans.MethodDescriptor(aMethod);
            } catch (Exception exc) { return null; };

aDescriptor.setName("setAction_");
            return aDescriptor;

} public java.beans.PropertyDescriptor getCustomer_PropertyDescriptor()
                                            throws java.beans.IntrospectionException { java.beans.PropertyDescriptor aDescriptor = null;
            try {
                aDescriptor = new java.beans.PropertyDescriptor( "Customer_", Class.forName(getBeanClassName()) );
            } catch (java.lang.ClassNotFoundException exc) {
            }
            aDescriptor.setBound(true);

return aDescriptor;
        }

/**
         * Return the getCustomer_ method descriptor.
         */
        public java.beans.MethodDescriptor getGetCustomer_MethodDescriptor() { java.beans.MethodDescriptor aDescriptor = null;
            try {
                java.lang.reflect.Method aMethod =
                        Class.forName(getBeanClassName()).getMethod( "getCustomer_", null );
                aDescriptor = new java.beans.MethodDescriptor(aMethod);
            } catch (Exception exc) { return null; };

aDescriptor.setName("getCustomer_");
            return aDescriptor;

}

/**
         * Return the setCustomer_ method descriptor.
         */
        public java.beans.MethodDescriptor getSetCustomer_MethodDescriptor() { java.beans.MethodDescriptor aDescriptor = null;
            try {
                java.lang.Class tclass[] = new java.lang.Class[1];
                tclass[0] = Class.forName("String");
                java.lang.reflect.Method aMethod =
                        Class.forName(getBeanClassName()).getMethod( "setCustomer_", tclass );
                aDescriptor = new java.beans.MethodDescriptor(aMethod);
            } catch (Exception exc) { return null; };
```

```
   aDescriptor.setName("setCustomer_");
   return aDescriptor;
} public java.beans.PropertyDescriptor getStreet_PropertyDescriptor()
                              throws java.beans.IntrospectionException { java.beans.PropertyDescriptor aDescriptor = null;
   try {
      aDescriptor = new java.beans.PropertyDescriptor( "Street_", Class.forName(getBeanClassName()) );
   } catch (java.lang.ClassNotFoundException exc) {
   }
   aDescriptor.setBound(true);

return aDescriptor;
}
/**
 * Return the getStreet_ method descriptor.
 */
public java.beans.MethodDescriptor getGetStreet_MethodDescriptor() { java.beans.MethodDescriptor aDescriptor = null;
   try {
      java.lang.reflect.Method aMethod =
            Class.forName(getBeanClassName()).getMethod( "getStreet_", null );
      aDescriptor = new java.beans.MethodDescriptor(aMethod);
   } catch (Exception exc) { return null; };

aDescriptor.setName("getStreet_");
   return aDescriptor;

}

/**
 * Return the setStreet_ method descriptor.
 */
public java.beans.MethodDescriptor getSetStreet_MethodDescriptor() { java.beans.MethodDescriptor aDescriptor = null;
   try {
      java.lang.Class tclass[] = new java.lang.Class[1];
      tclass[0] = Class.forName("String");
      java.lang.reflect.Method aMethod =
            Class.forName(getBeanClassName()).getMethod( "setStreet_", tclass );
      aDescriptor = new java.beans.MethodDescriptor(aMethod);
   } catch (Exception exc) { return null; };

aDescriptor.setName("setStreet_");
   return aDescriptor;

}
public java.beans.PropertyDescriptor getCity_PropertyDescriptor()
                              throws java.beans.IntrospectionException { java.beans.PropertyDescriptor aDescriptor = null;
```

-28-

```
   try {
      aDescriptor = new java.beans.PropertyDescriptor( "City_", Class.forName(getBeanClassName()) );
   } catch (java.lang.ClassNotFoundException exc) {
   }
   aDescriptor.setBound(true);

return aDescriptor;
}
/**
 * Return the getCity_ method descriptor.
 */
public java.beans.MethodDescriptor getGetCity_MethodDescriptor() { java.beans.MethodDescriptor aDescriptor = null;
   try {
      java.lang.reflect.Method aMethod =
            Class.forName(getBeanClassName()).getMethod( "getCity_", null );
      aDescriptor = new java.beans.MethodDescriptor(aMethod);
   } catch (Exception exc) { return null; };

.aDescriptor.setName("getCity_");
   return aDescriptor;

}

/**
 * Return the setCity_ method descriptor.
 */
public java.beans.MethodDescriptor getSetCity_MethodDescriptor() { java.beans.MethodDescriptor aDescriptor = null;
   try {
      java.lang.Class tclassffl" = new java.lang.Classffl1";
      tclassffl0" = Class.forName("String");
      java.lang.reflect.Method aMethod =
            Class.forName(getBeanClassName()).getMethod( "setCity_", tclass );
      aDescriptor = new java.beans.MethodDescriptor(aMethod);
   } catch (Exception exc) { return null; };

aDescriptor.setName("setCity_");
   return aDescriptor;

} public java.beans.PropertyDescriptor getProvince_PropertyDescriptor()
                                 throws java.beans.IntrospectionException { java.beans.PropertyDescriptor aDescriptor = null;
   try {
      aDescriptor = new java.beans.PropertyDescriptor( "Province_", Class.forName(getBeanClassName()) );
   } catch (java.lang.ClassNotFoundException exc) {
   }
   aDescriptor.setBound(true);

return aDescriptor;
}
```

- 29 -

```java
/**
 * Return the getProvince_ method descriptor.
 */
public java.beans.MethodDescriptor getGetProvince_MethodDescriptor() { java.beans.MethodDescriptor aDescriptor = null;
   try {
      java.lang.reflect.Method aMethod =
            Class.forName(getBeanClassName()).getMethod( "getProvince_", null );
      aDescriptor = new java.beans.MethodDescriptor(aMethod);
   } catch (Exception exc) { return null; };

aDescriptor.setName("getProvince_");
   return aDescriptor;

}

/**
 * Return the setProvince_ method descriptor.
 */
public java.beans.MethodDescriptor getSetProvince_MethodDescriptor() { java.beans.MethodDescriptor aDescriptor = null;
   try {
      java.lang.Class tclass₪" = new java.lang.ClassM1";
      tclass₪₀" = Class.forName("String");
      java.lang.reflect.Method aMethod =
            Class.forName(getBeanClassName()).getMethod( "setProvince_", tclass );
      aDescriptor = new java.beans.MethodDescriptor(aMethod);
   } catch (Exception exc) { return null; };

aDescriptor.setName("setProvince_");
   return aDescriptor;

} public java.beans.PropertyDescriptor getPostal_Code_PropertyDescriptor()
                                    throws java.beans.IntrospectionException { java.beans.PropertyDescriptor aDescriptor = null;
   try {
      aDescriptor = new java.beans.PropertyDescriptor( "Postal_Code_", Class.forName(getBeanClassName()) );
   } catch (java.lang.ClassNotFoundException exc) {
   }
   aDescriptor.setBound(true);

return aDescriptor;
}

/**
 * Return the getPostal_Code_ method descriptor.
 */
public java.beans.MethodDescriptor getGetPostal_Code_MethodDescriptor() { java.beans.MethodDescriptor aDescriptor = null;
   try {
      java.lang.reflect.Method aMethod =
            Class.forName(getBeanClassName()).getMethod( "getPostal_Code_", null );
```

```
      aDescriptor = new java.beans.MethodDescriptor(aMethod);
   } catch (Exception exc) { return null; };

aDescriptor.setName("getPostal_Code_");
   return aDescriptor;

}

/**
 * Return the setPostal_Code_ method descriptor.
 */
public java.beans.MethodDescriptor getSetPostal_Code_MethodDescriptor() { java.beans.MethodDescriptor aDescriptor = null;
   try {
      java.lang.Class tclass[] = new java.lang.Class[1];
      tclass[0] = Class.forName("String");
      java.lang.reflect.Method aMethod =
            Class.forName(getBeanClassName()).getMethod( "setPostal_Code_", tclass );
      aDescriptor = new java.beans.MethodDescriptor(aMethod);
   } catch (Exception exc) { return null; };

aDescriptor.setName("setPostal_Code_");
   return aDescriptor;

} public java.beans.PropertyDescriptor getAmount_PropertyDescriptor()
                                    throws java.beans.IntrospectionException { java.beans.PropertyDescriptor aDescriptor = null;
   try {
      aDescriptor = new java.beans.PropertyDescriptor( "Amount_", Class.forName(getBeanClassName()) );
   } catch (java.lang.ClassNotFoundException exc) {
   }
   aDescriptor.setBound(true);

return aDescriptor;
}
/**
 * Return the getAmount_ method descriptor.
 */
public java.beans.MethodDescriptor getGetAmount_MethodDescriptor() { java.beans.MethodDescriptor aDescriptor = null;
   try {
      java.lang.reflect.Method aMethod =
            Class.forName(getBeanClassName()).getMethod( "getAmount_", null );
      aDescriptor = new java.beans.MethodDescriptor(aMethod);
   } catch (Exception exc) { return null; };

aDescriptor.setName("getAmount_");
   return aDescriptor;

}
```

-31-

```
/**
 * Return the setAmount_ method descriptor.
 */
public java.beans.MethodDescriptor getSetAmount_MethodDescriptor() { java.beans.MethodDescriptor aDescriptor = null;
    try {
        java.lang.Class tclass[] = new java.lang.Class[1];
        tclass[0] = Class.forName("String");
        java.lang.reflect.Method aMethod =
                Class.forName(getBeanClassName()).getMethod( "setAmount_", tclass );
        aDescriptor = new java.beans.MethodDescriptor(aMethod);
    } catch (Exception exc) { return null; };

aDescriptor.setName("setAmount_");
    return aDescriptor;

} public java.beans.PropertyDescriptor getBalance_PropertyDescriptor()
                                    throws java.beans.IntrospectionException { java.beans.PropertyDescriptor aDescriptor = null;
    try {
        aDescriptor = new java.beans.PropertyDescriptor( "Balance_", Class.forName(getBeanClassName()) );
    } catch (java.lang.ClassNotFoundException exc) {
    }
    aDescriptor.setBound(true);

return aDescriptor;
}

/**
 * Return the getBalance_ method descriptor.
 */
public java.beans.MethodDescriptor getGetBalance_MethodDescriptor() { java.beans.MethodDescriptor aDescriptor = null;
    try {
        java.lang.reflect.Method aMethod =
                Class.forName(getBeanClassName()).getMethod( "getBalance_", null );
        aDescriptor = new java.beans.MethodDescriptor(aMethod);
    } catch (Exception exc) { return null; };

aDescriptor.setName("getBalance_");
    return aDescriptor;

}

/**
 * Return the setBalance_ method descriptor.
 */
public java.beans.MethodDescriptor getSetBalance_MethodDescriptor() { java.beans.MethodDescriptor aDescriptor = null;
    try {
        java.lang.Class tclass[] = new java.lang.Class[1];
        tclass[0] = Class.forName("String");
```

```
    java.lang.reflect.Method aMethod =
            Class.forName(getBeanClassName()).getMethod( "setBalance_", tclass );
    aDescriptor = new java.beans.MethodDescriptor(aMethod);
} catch (Exception exc) { return null; };

aDescriptor.setName("setBalance_");
return aDescriptor;

}
public java.beans.PropertyDescriptor[] getPropertyDescriptors() { try {
      java.beans.PropertyDescriptor aDescriptorList[] = {
          getCategory_PropertyDescriptor()
          ,getAccount_PropertyDescriptor()
          ,getAction_PropertyDescriptor()
          ,getCustomer_PropertyDescriptor()
          ,getStreet_PropertyDescriptor()
          ,getCity_PropertyDescriptor()
          ,getProvince_PropertyDescriptor()
          ,getPostal_Code_PropertyDescriptor()
          ,getAmount_PropertyDescriptor()
          ,getBalance_PropertyDescriptor()
      };
    return aDescriptorList;
    } catch (java.beans.IntrospectionException exc) {
        return null;
    }

} public java.beans.MethodDescriptor[] getMethodDescriptors() { java.beans.MethodDescriptor aDescriptorList[] = { getGetCategory_MethodDescriptor()
        ,getSetCategory_MethodDescriptor()
        ,getGetAccount_MethodDescriptor()
        ,getSetAccount_MethodDescriptor()
        ,getGetAction_MethodDescriptor()
        ,getSetAction_MethodDescriptor()
        ,getGetCustomer_MethodDescriptor()
        ,getSetCustomer_MethodDescriptor()
        ,getGetStreet_MethodDescriptor()
        ,getSetStreet_MethodDescriptor()
        ,getGetCity_MethodDescriptor()
        ,getSetCity_MethodDescriptor()
        ,getGetProvince_MethodDescriptor()
        ,getSetProvince_MethodDescriptor()
        ,getGetPostal_Code_MethodDescriptor()
        ,getSetPostal_Code_MethodDescriptor()
        ,getGetAmount_MethodDescriptor()
        ,getSetAmount_MethodDescriptor()
        ,getGetBalance_MethodDescriptor()
        ,getSetBalance_MethodDescriptor()
```

```
    };
    return aDescriptorList;
  }
} public class Bank_ActionCicsEciCommArea extends IDACicsEciCommArea
{ public Bank_ActionCicsEciCommArea () { super( "BNKTRANS" );

} public void notifyAllVars() { firePropertyChange( "Category_", DFHCOMMAREA_.AccountInfo_.oldCategory_,
              DFHCOMMAREA_.AccountInfo_.Category_);
    firePropertyChange( "Account_", DFHCOMMAREA_.oldAccountInfo_.oldAccount_,
              DFHCOMMAREA_.AccountInfo_.Account_);
    firePropertyChange( "Action_", DFHCOMMAREA_.oldAction_, DFHCOMMAREA_.Action_);
    firePropertyChange( "Customer_", DFHCOMMAREA_.oldCustomerInfo_.oldCustomer_,
              DFHCOMMAREA_.CustomerInfo_.Customer_);
    firePropertyChange( "Street_", DFHCOMMAREA_.CustomerInfo_.Addr_.oldStreet_,
              DFHCOMMAREA_.CustomerInfo_.Addr_.Street_);
    firePropertyChange( "City_", DFHCOMMAREA_.CustomerInfo_.Addr_.oldCity_,
              DFHCOMMAREA_.CustomerInfo_.Addr_.City_);
    firePropertyChange( "Province_", DFHCOMMAREA_.CustomerInfo_.Addr_.oldProvince_,
              DFHCOMMAREA_.CustomerInfo_.Addr_.Province_);
    firePropertyChange( "Postal_Code_", DFHCOMMAREA_.CustomerInfo_.Addr_.oldPostal_Code_,
              DFHCOMMAREA_.CustomerInfo_.Addr_.Postal_Code_);
    firePropertyChange( "Amount_", DFHCOMMAREA_.oldAmount_,
              DFHCOMMAREA_.Amount_);
    firePropertyChange( "Balance_", DFHCOMMAREA_.oldBalance_,
              DFHCOMMAREA_.Balance_);

} public String getCategory_ ( )
  {
      return (DFHCOMMAREA_.AccountInfo_.Category_);
  } public void setCategory_ ( String aCategory )
  {
      String oldCategory_ = DFHCOMMAREA_.AccountInfo_.Category_;
      DFHCOMMAREA_.AccountInfo_.Category_ = aCategory;
      firePropertyChange( "Category_", oldCategory_, DFHCOMMAREA_.AccountInfo_.Category_);
      return;
  } public int getAccount_ ( )
  {
      return (DFHCOMMAREA_.AccountInfo_.Account_);
  }
```

```
public void setAccount_ ( int aAccount )
{
    int oldAccount_ = DFHCOMMAREA_.AccountInfo_.Account_;
    DFHCOMMAREA_.AccountInfo_.Account_ = aAccount;
    firePropertyChange( "Account_", oldAccount_, DFHCOMMAREA_.AccountInfo_.Account_);
    return;
} public String getAction_ ( )
{
    return (DFHCOMMAREA_.Action_);
} public void setAction_ ( String aAction )
{
    String oldAction_ = DFHCOMMAREA_.Action_;
    DFHCOMMAREA_.Action_ = aAction;
    firePropertyChange( "Action_", oldAction_, DFHCOMMAREA_.Action_);
    return;
} public String getCustomer_ ( )
{
    return (DFHCOMMAREA_.CustomerInfo_.Customer_);
} public void setCustomer_ ( String aCustomer )
{
    String oldCustomer_ = DFHCOMMAREA_.CustomerInfo_.Customer_;
    DFHCOMMAREA_.CustomerInfo_.Customer_ = aCustomer;
    firePropertyChange( "Customer_", oldCustomer_, DFHCOMMAREA_.CustomerInfo_.Customer_);
    return;
} public String getStreet_ ( )
{
    return (DFHCOMMAREA_.CustomerInfo_.Addr_.Street_);
} public void setStreet_ ( String aStreet )
{
    String oldStreet_ = DFHCOMMAREA_.CustomerInfo_.Addr_.Street_;
    DFHCOMMAREA_.CustomerInfo_.Addr_.Street_ = aStreet;
    firePropertyChange( "Street_", oldStreet_, DFHCOMMAREA_.CustomerInfo_.Addr_.Street_);
    return;
} public String getCity_ ( )
{
    return (DFHCOMMAREA_.CustomerInfo_.Addr_.City_);
} public void setCity_ ( String aCity )
{
    String oldCity_ = DFHCOMMAREA_.CustomerInfo_.Addr_.City_;
    DFHCOMMAREA_.CustomerInfo_.Addr_.City_ = aCity;
    firePropertyChange( "City_", oldCity_, DFHCOMMAREA_.CustomerInfo_.Addr_.City_);
    return;
}
```

```java
public void setAccount_ ( int aAccount )
{
    int oldAccount_ = DFHCOMMAREA_.AccountInfo_.Account_;
    DFHCOMMAREA_.AccountInfo_.Account_ = aAccount;
    firePropertyChange( "Account_", oldAccount_, DFHCOMMAREA_.AccountInfo_.Account_);
    return;
} public String getAction_ ( )
{
    return (DFHCOMMAREA_.Action_);
} public void setAction_ ( String aAction )
{
    String oldAction_ = DFHCOMMAREA_.Action_;
    DFHCOMMAREA_.Action_ = aAction;
    firePropertyChange( "Action_", oldAction_, DFHCOMMAREA_.Action_);
    return;
} public String getCustomer_ ( )
{
    return (DFHCOMMAREA_.CustomerInfo_.Customer_);
} public void setCustomer_ ( String aCustomer )
{
    String oldCustomer_ = DFHCOMMAREA_.CustomerInfo_.Customer_;
    DFHCOMMAREA_.CustomerInfo_.Customer_ = aCustomer;
    firePropertyChange( "Customer_", oldCustomer_, DFHCOMMAREA_.CustomerInfo_.Customer_);
    return;
} public String getStreet_ ( )
{
    return (DFHCOMMAREA_.CustomerInfo_.Addr_.Street_);
} public void setStreet_ ( String aStreet )
{
    String oldStreet_ = DFHCOMMAREA_.CustomerInfo_.Addr_.Street_;
    DFHCOMMAREA_.CustomerInfo_.Addr_.Street_ = aStreet;
    firePropertyChange( "Street_", oldStreet_, DFHCOMMAREA_.CustomerInfo_.Addr_.Street_);
    return;
} public String getCity_ ( )
{
    return (DFHCOMMAREA_.CustomerInfo_.Addr_.City_);
} public void setCity_ ( String aCity )
{
    String oldCity_ = DFHCOMMAREA_.CustomerInfo_.Addr_.City_;
    DFHCOMMAREA_.CustomerInfo_.Addr_.City_ = aCity;
    firePropertyChange( "City_", oldCity_, DFHCOMMAREA_.CustomerInfo_.Addr_.City_);
    return;
}
```

```
public String getProvince_ ( )
{
    return (DFHCOMMAREA_.CustomerInfo_.Addr_.Province_);
} public void setProvince_ ( String aProvince )
{
    String oldProvince_ = DFHCOMMAREA_.CustomerInfo_.Addr_.Province_;
    DFHCOMMAREA_.CustomerInfo_.Addr_.Province_ = aProvince;
    firePropertyChange( "Province_", oldProvince_, DFHCOMMAREA_.CustomerInfo_.Addr_.Province_);
    return;
} public String getPostal_Code_ ( )
{
    return (DFHCOMMAREA_.CustomerInfo_.Addr_.Postal_Code_);
} public void setPostal_Code_ ( String aPostal_Code )
{
    String oldPostal_Code_ = DFHCOMMAREA_.CustomerInfo_.Addr_.Postal_Code_;
    DFHCOMMAREA_.CustomerInfo_.Addr_.Postal_Code_ = aPostal_Code;
    firePropertyChange( "Postal_Code_", oldPostal_Code_, DFHCOMMAREA_.CustomerInfo_.Addr_.Postal_Code_);
    return;
} public String getAmount_ ( )
{
    return (DFHCOMMAREA_.Amount_);
} public void setAmount_ ( String aAmount )
{
    String oldAmount_ = DFHCOMMAREA_.Amount_;
    DFHCOMMAREA_.Amount_ = aAmount;
    firePropertyChange( "Amount_", oldAmount_, DFHCOMMAREA_.Amount_);
    return;
} public String getBalance_ ( )
{
    return (DFHCOMMAREA_.Balance_);
} public void setBalance_ ( String aBalance )
{
    String oldBalance_ = DFHCOMMAREA_.Balance_;
    DFHCOMMAREA_.Balance_ = aBalance;
    firePropertyChange( "Balance_", oldBalance_, DFHCOMMAREA_.Balance_);
    return;
} public Bank_Action_DFHCOMMAREA DFHCOMMAREA_ = new Bank_Action_DFHCOMMAREA();

protected void setCommArea( IDACallHandleCics ch ) throws IDAException
{
    int i;
```

```
        DFHCOMMAREA_.setCommArea(ch);
} protected void getCommResult( IDACallHandleCics ch ) throws IDAException
{
   int i;

DFHCOMMAREA_.AccountInfo_.oldCategory_ = DFHCOMMAREA_.AccountInfo_.Category_;
        DFHCOMMAREA_.oldAccountInfo_.oldAccount_ = DFHCOMMAREA_.AccountInfo_.Account_;
        DFHCOMMAREA_.oldAction_ = DFHCOMMAREA_.Action_;
        DFHCOMMAREA_.oldCustomerInfo_.oldCustomer_ = DFHCOMMAREA_.CustomerInfo_.Customer_;
        DFHCOMMAREA_.CustomerInfo_.Addr_.oldStreet_ = DFHCOMMAREA_.CustomerInfo_.Addr_.Street_;
        DFHCOMMAREA_.CustomerInfo_.Addr_.oldCity_ = DFHCOMMAREA_.CustomerInfo_.Addr_.City_;
        DFHCOMMAREA_.CustomerInfo_.Addr_.oldProvince_ = DFHCOMMAREA_.CustomerInfo_.Addr_.Province_;
        DFHCOMMAREA_.CustomerInfo_.Addr_.oldPostal_Code_ = DFHCOMMAREA_.CustomerInfo_.Addr_.Postal_Code_;
        DFHCOMMAREA_.oldAmount_ = DFHCOMMAREA_.Amount_;
        DFHCOMMAREA_.oldBalance_ = DFHCOMMAREA_.Balance_;

DFHCOMMAREA_.getCommResult(ch);
        notifyAllVars();
}

}
public class Bank_Action_DFHCOMMAREA
{ public Bank_Action_DFHCOMMAREA () {
} public Bank_Action_DFHCOMMAREA_AccountInfo AccountInfo_ = new Bank_Action_DFHCOMMAREA_AccountInfo();
public Bank_Action_DFHCOMMAREA_AccountInfo oldAccountInfo_ = new Bank_Action_DFHCOMMAREA_AccountInfo();

public String Action_ = new String();
public String oldAction_ = new String();

public Bank_Action_DFHCOMMAREA_CustomerInfo CustomerInfo_ = new Bank_Action_DFHCOMMAREA_CustomerInfo();
public Bank_Action_DFHCOMMAREA_CustomerInfo oldCustomerInfo_ = new Bank_Action_DFHCOMMAREA_CustomerInfo();

public String Amount_ = new String();
public String oldAmount_ = new String();

public String Balance_ = new String();
public String oldBalance_ = new String();

protected void setCommArea( IDACallHandleCics ch ) throws IDAException
{
   int i;

AccountInfo_.setCommArea(ch);

ch.PIC("x(4)");
        ch.AUG("DISPLAY");
        ch.flatten ( Action_ );
```

```
        CustomerInfo_.setCommArea(ch);

ch.PIC("$999.99");
        ch.AUG("DISPLAY");
        ch.flatten ( Amount_ );

ch.PIC("$99999.99");
        ch.AUG("DISPLAY");
        ch.flatten ( Balance_ );
    } protected void getCommResult( IDACallHandleCics ch ) throws IDAException
    {
        int i;

AccountInfo_.getCommResult(ch);

ch.PIC( "x(4)" );
        ch.AUG( "DISPLAY" );
        Action_ = ch.resurrect_String();

CustomerInfo_.getCommResult(ch);

ch.PIC( "$999.99" );
        ch.AUG( "DISPLAY" );
        Amount_ = ch.resurrect_String();

ch.PIC( "$99999.99" );
        ch.AUG( "DISPLAY" );
        Balance_ = ch.resurrect_String();
    }

}
```

What is claimed is:

1. An import utility for interfacing a COBOL program through a CICS transaction executing in a first program environment on a first computer device to a program specific to another program environment on a second computer device, said import utility comprising:
   (a) scanner means for scanning the CICS transaction for said COBOL program and producing a data description of said CICS transaction;
   (b) parser means for parsing said data description into a corresponding token stream;
   (c) importer means for importing said token stream and automatically generating a data model describing said CICS transaction in said another program environment, said data model including means for converting information between said CICS transaction and a program in said another program environment, and said data model being compatible for generating code for an invoking mechanism in a program for remotely invoking said CICS transaction from said another program environment on said second computer machine, without transforming CICS data in said first program environment.

2. The import utility as claimed in claim 1, wherein said invoking mechanism comprises a method call for accessing said CICS transaction through an External Call Interface.

3. The import utility as claimed in claim 2, further including means for selecting a CICS transaction in the COBOL program, and means for specifying a class in said program for said method.

4. The import utility as claimed in claim 2, wherein said program environment comprises a $C^{++}$ environment.

5. The import utility as claimed in claim 2, wherein said program environment comprises a JAVA environment.

6. A computer system having a first program environment on a first computer device and a second program environment on a second computer device, said computer system comprising:
   an importer having scanner means for scanning a transaction interface for a program running in said first program environment and producing an output describing the transaction interface for the program in said first program environment, parser means for parsing the output description from said scanner means and generating a token stream, creator means for creating a data model from said token stream, wherein said data model includes means for converting information from said transaction interface for a program running in said second program environment;
   a compiler having means for compiling a program in said second program environment and said data model to produce an executable program, said executable program including invoking means derived from said data model for remotely accessing the program operating in said first program environment without transforming said transaction interface in said first program environment.

7. The computer system as claimed in claim 6, wherein said data model includes means for converting data types between said first and second program environments.

8. The computer system as claimed in claim 7, wherein said data model includes means for converting codepages for said first and second program environments.

9. The computer system as claimed in claim 7, wherein said data model includes means for converting between CICS program semantics and JAVA programming semantics.

10. A computer program product for use in a computer system having a first program environment on a first computer device and a second program environment on a second computer device, said first program environment providing an operating platform for a COBOL program and CICS transactions, said computer program product comprising:
    a recording medium;
    means recorded on said medium for instructing said computer system to perform the steps of,
    (a) scanning the CICS transaction in said COBOL program and producing a data description of said CICS transaction;
    (b) parsing said data description into a corresponding token stream;
    (c) creating a data model from said token stream wherein said data model describes said CICS transaction in said second program environment and includes means for converting information between said first and second program environments, and said data model being compatible for generating code for an invoking mechanism in a program for remotely invoking said CICS transaction from said second program environment without transforming CICS data in said first program environment.

11. The computer system as claimed in claim 10, wherein said second program environment comprises a $C^{++}$ environment.

12. The import utility as claimed in claim 10, wherein said second program environment comprises a JAVA environment.

* * * * *